(12) United States Patent
Guo et al.

(10) Patent No.: US 12,101,866 B2
(45) Date of Patent: Sep. 24, 2024

(54) PHASE-GATE HYBRID COATING CRISP PLATE

(71) Applicant: WHIRLPOOL CORPORATION, Benton Harbor, MI (US)

(72) Inventors: Hua Guo, Shenzhen (CN); Muhammad Khizar, St. Joseph, MI (US); Ping Wu, Shenzhen (CN); Tingting Yu, Shenzhen (CN); JingJing Tong, Foshan (CN)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 888 days.

(21) Appl. No.: 17/137,752

(22) Filed: Dec. 30, 2020

(65) Prior Publication Data

US 2022/0202235 A1    Jun. 30, 2022

(51) Int. Cl.
| | |
|---|---|
| *H05B 6/64* | (2006.01) |
| *A47J 36/02* | (2006.01) |
| *C08K 3/04* | (2006.01) |
| *C08K 3/11* | (2018.01) |
| *C09D 183/04* | (2006.01) |

(52) U.S. Cl.
CPC .......... *H05B 6/6494* (2013.01); *A47J 36/027* (2013.01); *C09D 183/04* (2013.01); *H05B 6/6411* (2013.01); *C08K 3/041* (2017.05); *C08K 3/11* (2018.01); *H05B 2214/04* (2013.01)

(58) Field of Classification Search
None
See application file for complete search history.

(56) References Cited

U.S. PATENT DOCUMENTS

| | | | |
|---|---|---|---|
| 6,077,454 | A | 6/2000 | Tenzer |
| 8,247,750 | B2 | 8/2012 | Lai et al. |
| 9,781,777 | B2 | 10/2017 | Jeon et al. |
| 9,814,349 | B2 | 11/2017 | Dubanchet et al. |
| 10,244,586 | B2 | 3/2019 | Barea et al. |
| 2007/0102427 | A1 | 5/2007 | Young |
| 2015/0201799 | A1 | 7/2015 | Dubanchet et al. |

(Continued)

FOREIGN PATENT DOCUMENTS

| | | | | |
|---|---|---|---|---|
| CN | 103102620 | A | * 5/2013 | |
| GB | 2533598 | A | * 6/2016 | ....... G06K 19/07309 |

(Continued)

OTHER PUBLICATIONS

CN 103102620 A (Zhang, Xian et al.) May 15, 2013 [retrieved Nov. 4, 2023]. Retrieved from Foreign Image and Text database, translation by Clarivate Analytics. (Year: 2013).*

(Continued)

*Primary Examiner* — John J Norton
(74) *Attorney, Agent, or Firm* — Price Heneveld LLP

(57) ABSTRACT

A microwave-heating crisp plate includes a body defining a food-supporting surface and an outer surface opposite the food-supporting surface, and a coating applied over at least a portion of the outer surface. The coating includes a base polymer material defining a matrix, carbon nanotubes, and ferrite particles. The carbon nanotubes and the ferrite particles are dispersed throughout the matrix in a predetermined relative ratio and in a predetermined dispersal ratio with respect to the matrix.

20 Claims, 5 Drawing Sheets

(56) References Cited

U.S. PATENT DOCUMENTS

| | | |
|---|---|---|
| 2018/0220500 A1 | 8/2018 | Staton et al. |
| 2019/0185632 A1* | 6/2019 | Christy .............. C08G 16/0231 |
| 2020/0163172 A1 | 5/2020 | Khizar et al. |
| 2020/0227833 A1* | 7/2020 | Hiroi ........................ H01F 1/34 |
| 2022/0030675 A1 | 1/2022 | Maro et al. |

FOREIGN PATENT DOCUMENTS

| | | | |
|---|---|---|---|
| KR | 2007038759 A * | 4/2007 | ............. B82Y 30/00 |
| WO | 2020189548 A1 | 9/2020 | |
| WO | WO-2021094836 A1 * | 5/2021 | ........... C01B 32/158 |

OTHER PUBLICATIONS

KR 2007-0038759 (Kim, Bun Sung et al.) Apr. 11, 2007 [retrieved Nov. 4, 2023]. Retrieved from Foreign Image and Text database, translation by Clarivate Analytics. (Year: 2007).*

* cited by examiner

US 12,101,866 B2

PHASE-GATE HYBRID COATING CRISP PLATE

BACKGROUND OF THE DISCLOSURE

The present disclosure generally relates to a crisp plate for use in a microwave oven, and more specifically, to a phase-stage hybrid nanocoating for a crisp plate.

SUMMARY OF THE DISCLOSURE

According to one aspect of the present disclosure, a microwave-heating crisp plate includes a body defining a food-supporting surface and an outer surface opposite the food-supporting surface, and a coating applied over at least a portion of the outer surface. The coating includes a base polymer material defining a matrix, carbon nanotubes, and ferrite particles. The carbon nanotubes and the ferrite particles are dispersed throughout the matrix in a predetermined relative ratio and in a predetermined dispersal ratio with respect to the matrix.

According to another aspect of the present disclosure, a method for fabricating a microwave-heating crisp plate includes dispersing carbon nanotubes and ferrite particles in a liquid-phase polymer base matrix material in a predetermined relative ratio of carbon nanotubes to ferrite particles and in a predetermined dispersal ratio of carbon nanotubes to ferrite particles, combined, with respect to the matrix to derive a hybrid nanocoating. The method further includes applying the hybrid nanocoating at a predetermined thickness over an outer surface of a body defining a food-supporting surface and the outer surface opposite the food-supporting surface.

According to yet another aspect of the present disclosure, a microwave-heating crisp plate includes a body defining a food-supporting surface and an outer surface opposite the food-supporting surface. A coating is applied over at least a portion of the outer surface and includes a base polymer material defining a matrix, carbon nanotubes having a low Curie temperature of about 210° C., and ferrite particles having a high Curie temperature of about 350° C. The carbon nanotubes and the ferrite particles are dispersed throughout the matrix.

These and other features, advantages, and objects of the present disclosure will be further understood and appreciated by those skilled in the art by reference to the following specification, claims, and appended drawings.

Figure 1:
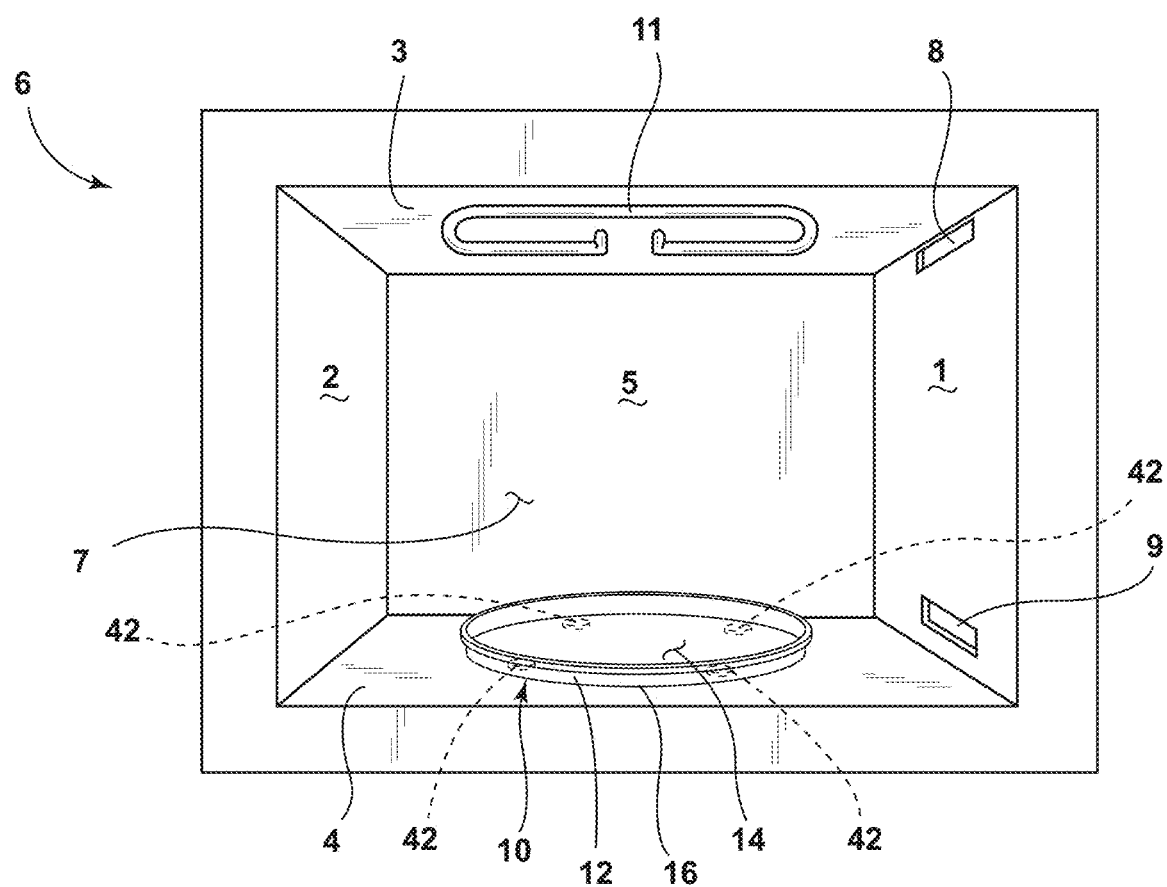
FIG. 1 is a perspective view of a microwave oven having a crisp plate placed therein.

The components in the figures are not necessarily to scale, emphasis instead being placed upon illustrating the principles described herein.

DETAILED DESCRIPTION

The present illustrated embodiments reside primarily in combinations of method steps and apparatus components related to a microwave crisp plate with a hybrid nanocoating. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element. As used herein, the term "about" may be used to modify a dimension or other numeric value to indicate an approximate value that may, for example, encompass various manufacturing tolerance ranges and/or errors in measurement techniques and associated tools or devices, as are generally known in the art. Additionally or alternatively, the term "about" may indicate that the associated measurement of value may vary from that listed by +/−10%.

Referring to FIGS. 1-5, reference numeral 10 generally designates a microwave-heating crisp plate. The crisp plate 10 includes a body 12 defining a food-supporting surface 14 and an outer surface 16 opposite the food-supporting surface 14. The crisp plate 10 also includes a coating 18 applied over at least a portion of the outer surface 16. The coating 18 includes a base polymer material defining a matrix 20, carbon nanotubes 22, and ferrite particles 24. The carbon nanotubes 22 and the ferrite particles 24 are dispersed throughout the matrix 20 in a predetermined relative ratio and in a predetermined dispersal ratio with respect to the matrix 20.

As further described herein, the coating 18 is what is referred to herein as a phase-stage hybrid nanocoating. In developing such a phase-stage hybrid nanocoating, carbon nanotubes comprising, for example, carbon ferrite powder (grown in nanotube form by chemical vapor deposition, by further example) are mixed with ferrite particles, which may comprise nickel manganese ferrite (Ni0.5Mn0.5Fe2O4 (NMFO)). The carbon nanotubes are contemplated to have a diameter of about 3 nm. Then ferrite particles are also contemplated as nanoparticles and may, accordingly, have a diameter of between about 30 nm and 50 nm. It has been found that the exceptionally large surface area and nanopits of the carbon nanotubes helps to strengthen interface connections with the ferrite particles. Talc or other fillers can also be included in the mixture in varying amounts.

The hybrid network of carbon nanotubes 22 and ferrite nanoparticles 24 may then be blended with the above mentioned two-part pre-polymerized polymer, which in an implementation can be a two-part silicone, to disperse the nanotubes 22 and particles 24 in the pre-polymerized polymer. As can be generally appreciated, a pre-polymerized polymer is a monomer or system of monomers that have been reacted to an intermediate molecular mass state. This material is capable of further polymerization by reactive groups to a fully cured high molecular weight state. As such, mixtures of reactive polymers with un-reacted monomers may also be referred to as pre-polymers. The term "pre-polymer" and "polymer precursor" may be interchanged. Upon further polymerization (i.e., cross-linking) of the two parts, a solid polymer matrix is realized in which the hybrid network of carbon nanotubes 22 and ferrite nanoparticles 24 is fixed. The incorporation of carbon nanotubes 22 and ferrite nanoparticles 24 into the liner helps to enhance the electrical conductivity and toughness of the liner, while reducing the brittleness of the nickel manganese ferrite by converting the hybrid material system into an electromagnetic radiation absorbing liner. In this respect, the coating 18 may offer high mechanical strength, improved resistance against corrosion and high sensitivity to electromagnetic radiation absorption. Moreover, the coating 18 may present improvements to its inter-laminar fracture toughness, delamination resistance, in-plane mechanical and thermal performance, damping, and thermo-elastic behavior, which makes this hybrid coating an ideal liner for a crisp plate application.

Referring now to FIG. 1, a microwave oven 6 is shown, in which a door for closing a cavity 7 of the microwave oven 6 has been omitted. The cavity 7 is defined by sidewalls 1 and 2, a top wall 3, a bottom wall 4, and a rear wall 5. Disposed along the right sidewall 1, upper and lower input openings 8 and 9 are configured to supply microwaves 32 (see FIG. 5) into the cavity 7 from a microwave source via a waveguide device 30. The input openings 8, 9 and the waveguide device 30 are arranged to supply microwaves 32 to the cavity 7 for cooking a food substrate. In the embodiment shown in FIG. 1, an electric browning element 11 is positioned along the top wall 3 of the cavity 7 and is configured for browning the upper side of a food substrate by electric heating means.

As further shown in FIG. 1, a crisp plate 10 is positioned adjacent the bottom wall 4 of the cavity 7. The crisp plate 10 may be a removable plate that is positioned directly on the bottom wall 4 of the cavity 7. The crisp plate 10 may also be situated on a support plate, such as support plate 26 shown in FIG. 5. As further shown in FIG. 2, the crisp plate 10 is supported on an upper surface 26a of the support plate 26, and the support plate 26 is further supported from an undersurface 26b of the support plate 26 by a rotation mechanism 28 having an arm 34 and wheel 36.

Figure 2:
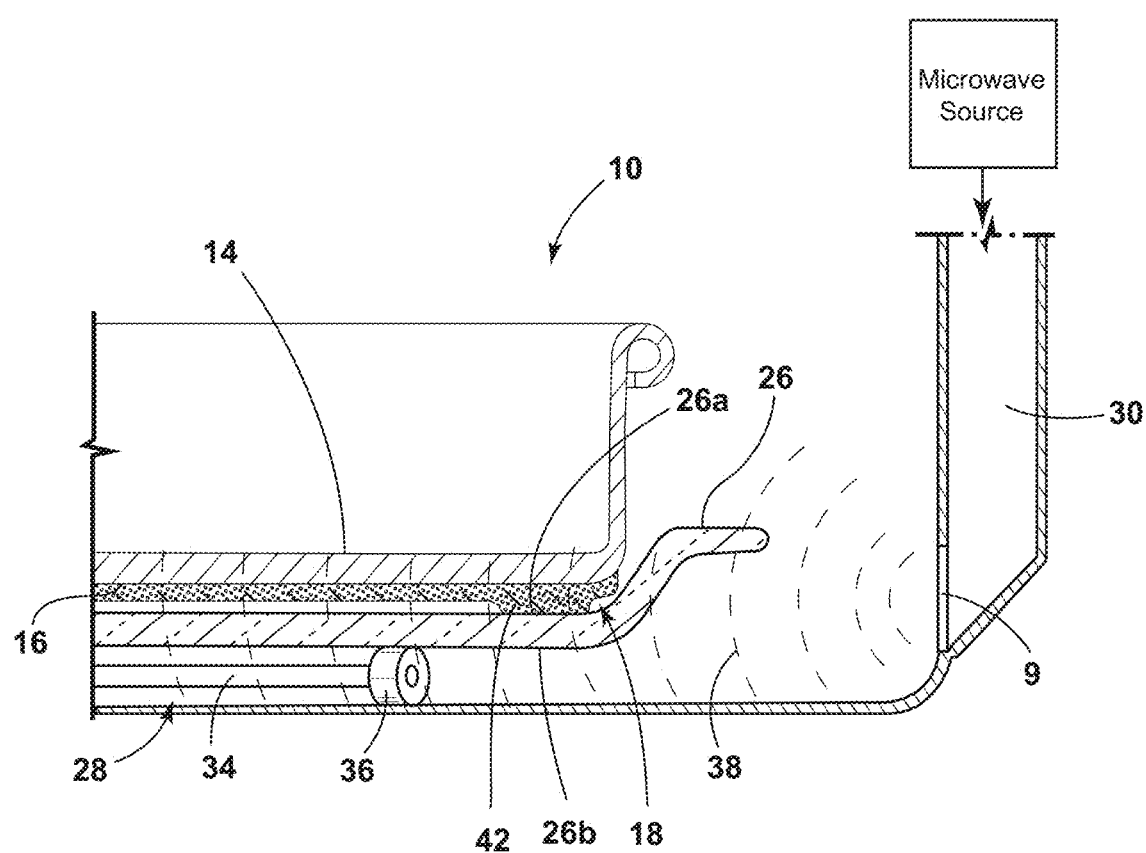
FIG. 2 is a fragmentary cross-sectional view of the microwave oven and crisp plate.
Figure 3:
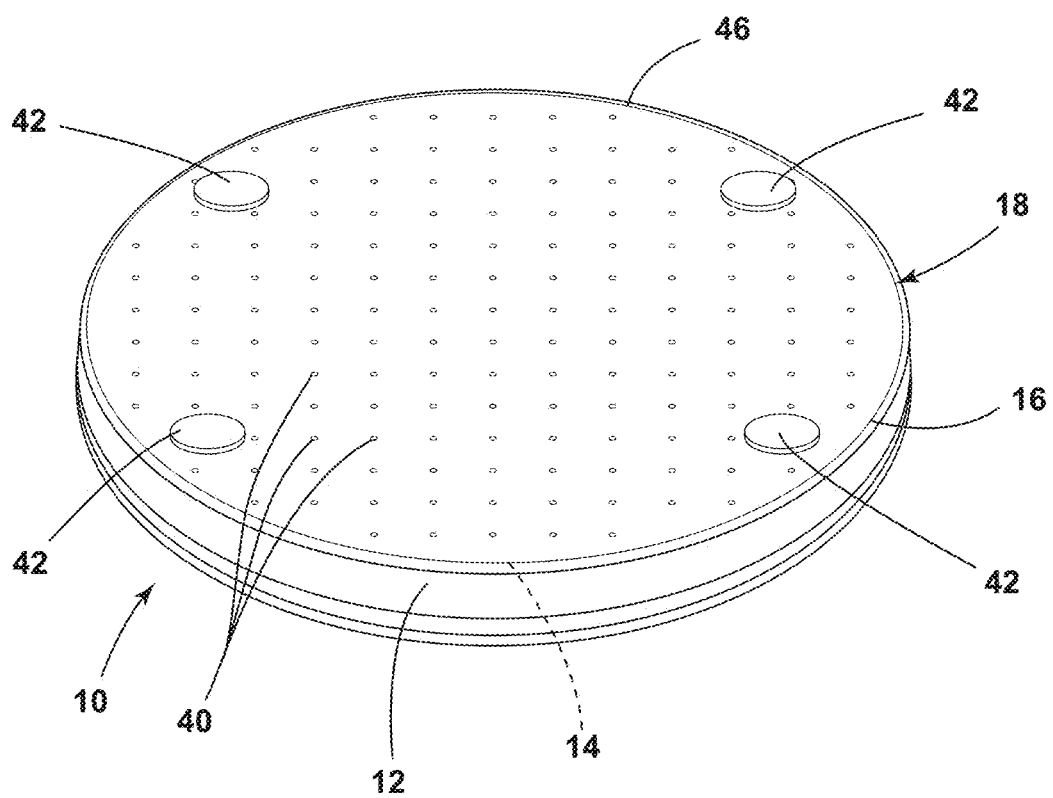
FIG. 3 is a perspective view of a microwave crisp plate in an inverted state showing a hybrid nanocoating according to the present disclosure applied thereto.
Figure 4:
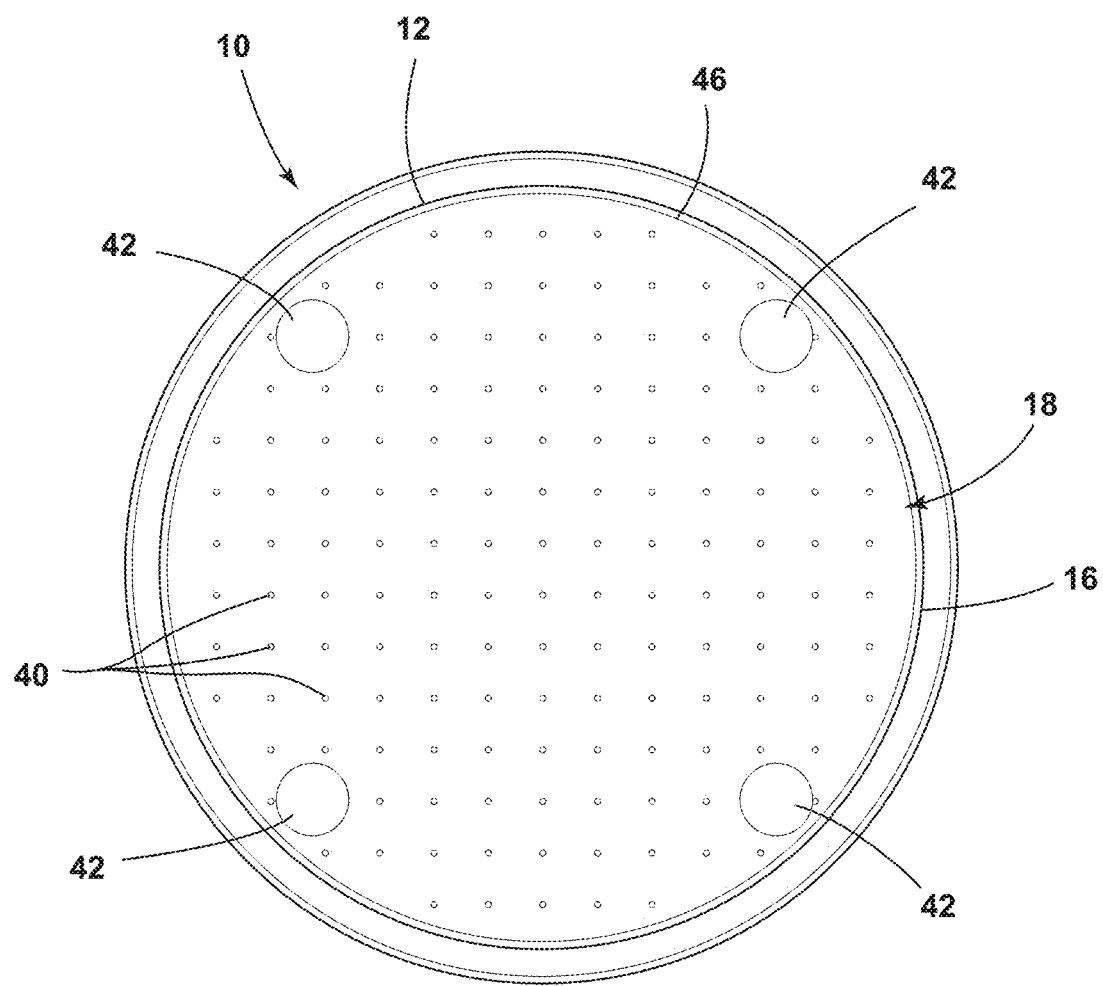
FIG. 4 is a bottom view of the crisp plate of FIG. 3.

In FIG. 2, the crisp plate 10 is shown in operation within microwave oven 6. In particular, the crisp plate 10 is shown including the above-described coating 18, according to the present concept. As discussed further below, the coating 18 is designed to enhance the browning features of the crisp plate 10 when used in microwave ovens. Specifically, the coating 18 of the present concept is configured to offer uniform conductive heating of a food article positioned on and in contact with the food supporting surface of the crisp plate body 12, as well as to provide improved heating times, consume less energy in a cooking procedure, and include upper temperature limits to avoid overcooking or burning of food substrates. In FIGS. 2-4, the coating 18 is shown disposed on the outer surface 16 of a body 12, opposite the food supporting surface 14, such that the coating 18 is positioned toward bottom wall 4, relative to the body 12. It is contemplated that the body 12 may be of a ceramic material or a metal material, such as aluminum or the like. Further, it is contemplated that the coating 18 may also be positioned over the food supporting surface 14, alone or in combination with the portion of the coating 18 applied over the outer surface 16, including or excluding application over the depicted sidewalls that extend upward to encircle the food supporting surface 14.

As used herein, the term "crisp plate" is meant to refer to a plate that aids in the browning or crisping of a food substrate when exposed to microwave radiation. The crisp plate 10 may also be referred to herein as a browning plate, a crisper pan, or a susceptor plate. Further, as used herein, the term "coating" is meant to refer to a covering or film that is provided on a surface of a crisp plate to improve the performance of the same. The proposed coating 18 of the present concept may additionally or alternatively be referred to herein as a covering, a film, a layer, a hybrid nanoreinforced coating, a matrix or a composite material. Referring to FIG. 2, the body 12, in particular the outer surface 16, has been partially covered with the coating 18 of the present concept such that the body 12 defines a crisp plate 10 as used in the microwave 6, as shown in FIG. 1.

Several types of polymers have been considered as suitable matrices for highly conductive carbon nanotube/polymer composites. Selection of a particular polymer heavily depends on a multitude of factors that must be considered in order to meet certain selection criteria. Electrical conductivity heavily depends on the ease of electron transfer throughout a material. While most polymer materials are insulators with very low electrical conductivity properties, the addition of carbon nanotubes and ferrite nanoparticles to the polymer matrix improves the electrical conductivity of the composite material due to the carbon nanotube network formation within the composite material. Disrupting carbon nanotube network formation plays a critical role in reducing the electrical resistivity of the carbon nanotube-polymer composite by either forming a resistive material barrier between carbon nanotubes or by limiting direct carbon nanotube interconnection. As such, the polymer matrix blended with nickel manganese ferrite particles alone is contemplated to have an electrical conductivity level that is less than an electrical conductivity level of the composite matrix of the polymer matrix combined with the network of carbon nanotubes. As used herein, the term "network" is contemplated to describe a formation of carbon nanotubes (with or without nickel manganese ferrite nanoparticles) that provides unbroken connections across a substrate, such as a crisp plate.

Figure 5:
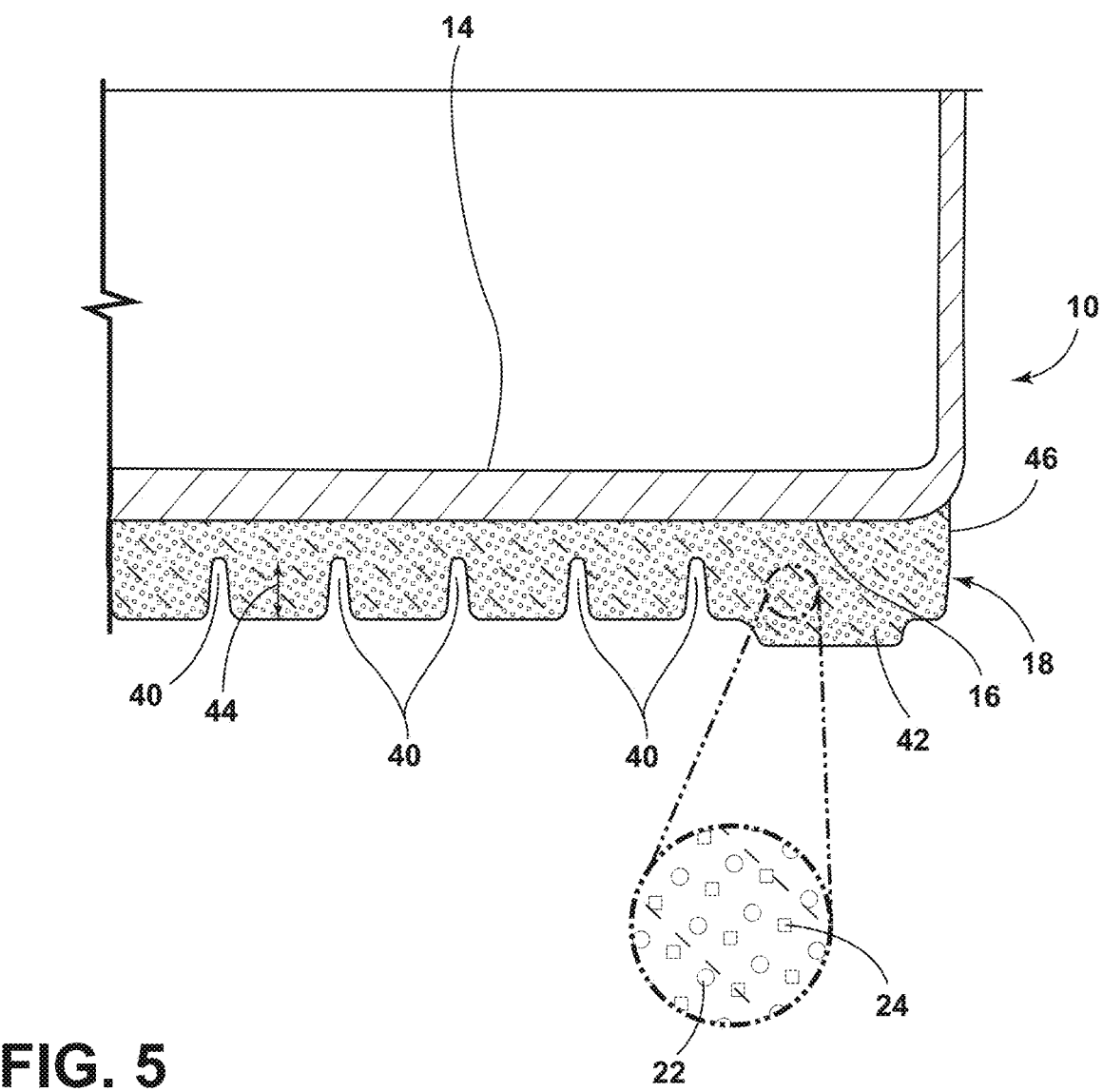
FIG. 5 is a fragmentary cross-sectional view of the microwave crisp plate taken along the line IV-IV in FIG. 4.

Referring now to FIG. 5, the coating 18 is shown in further cross-sectional detail. The component parts of the coating 18 are shown as being intermixed components, as applied over the outer surface 16 of the body 12. The coating 18 shown in FIG. 5 includes carbon nanotubes 22 and ferrite nanoparticles 24. The network of carbon nanotubes 22 along with ferrite nanoparticles 24 is contemplated to be dispersed throughout the coating 18, such that microwave absorption is consistent throughout the coating 18 as applied to the crisp plate 10. The base polymer material 20 is also shown in FIG.

5 and is contemplated to have the carbon nanotubes 22 along with ferrite nanoparticles 24 embedded within a matrix provided by the polymer component 44.

As further shown in FIG. 5, as well as in FIGS. 3 and 4, the coating 18 defines a plurality of perforations 40 at least partially through the coating 18 in a direction toward the outside surface 16 of the body 12. In various implementations, the perforations can extend entirely through the coating 18 to expose portions of the outer surface 16 or may extend only partially through the coating 18 (for example between about 50% and about 90% of the thickness 44 of coating 18). The presence of such perforations 40 may prevent the formation of gas bubbles, including during fabrication of crisp plate 10, that may interfere with the performance of coating 18 as well as the adhesion thereof to body 12. Additionally, the coating 18 may define a plurality of feet 42 that extend beyond the thickness 44 of coating 18 in select locations around, for example, the perimeter of crisp plate 10. In one example, the thickness of coating 18 can be between about 3 mm and about 5 mm. Such a coating 18 can include four feet at evenly-spaced intervals spaced at about 2 to 5 mm from a perimeter 46 of the coating 18. The feet, in one example, can extend to about 2.5 mm beyond the thickness 44 of the coating 18. The presence of feet 42 allow for improved exposure of coating 18 to microwaves 38, particularly when placed directly on the bottom wall 4 of a microwave oven 6 cavity 7.

It is further an object of the present concept to develop certain upper temperature limits of the coating 18 when applied to select surfaces. As noted above, the coating 18 is to be used to create a browning plate or crisp plate disposed within a microwave, such as crisp plate 10 disposed within microwave 6 (FIGS. 1 and 2). Thus, the coating 18, as applied to the crisp plate 10 and positioned within the cavity 7 of the microwave 6, is exposed to microwaves 38. The coating 18 of the present concept is configured to rapidly heat up to a suitable cooking temperature during a cooking procedure that, in turn, causes heating of the body 12 by conduction from the coating 18. The body 12 then provides conductive heating, necessary for browning, to food articles positioned on food supporting surface 16. Specifically, the coating 18 of the present concept is configured to heat up to a cooking temperature of approximately 200° C. in approximately 2 minutes under electromagnetic radiation exposure. The coating 18 of the present concept is further configured to include an upper heat limit of approximately 250° C. The novel compilation of component parts of the coating 18 has been specifically formulated to ensure that the upper heat limit will not be exceeded regardless of the exposure time of the coating 18 to microwaves 38 during a cooking procedure. In this way, the coating 18 provides for a crisp plate 10 that avoids over cooking or burning of food substrates by controlling the upper heat limit.

The desired heating profile of the coating 18 is derived by the properties of the carbon nanotubes and the ferrite nanoparticles used in the coating. In particular, the proposed phase-stage hybrid nanocoating approach uses carbon nanotubes comprised of carbon ferrite powder having a low Curie temperature of about 210° C. The carbon nanotubes are dispersed with ferrite nanoparticles comprising nickel manganese ferrite (Ni0.5Mn0.5Fe2O4 (NMFO)) with a high Curie temperature of about 350° C. in a controlled mixing ratio to enhance the conformal heating efficiency and temperature profile of the crisp plate 10 to improve the cooking performance thereof. In this respect, the coating 18 offers improved heat distribution performance and noticeable increase to the heating temperature profile of the crisp plate 10 when exposed to electromagnetic ("EM") radiation, particularly within micro-wave frequency ranges of, for example, about 2.45 GHz. The blending of the carbon nanotubes and ferric nanoparticles is carried out to achieve specific mixing ratios, vacuolization temperatures and processing conditions to develop the subject phase-stage hybrid nanocoating. As discussed above, the carbon nanotubes 22 and the ferrite nanoparticles 24 are dispersed within the polymer matrix material 20 in a relative ratio of carbon nanotubes 22 to ferrite nanoparticles 24, as well as a dispersal ratio of the total particles (i.e., carbon nanotubes 22 and ferrite nanoparticles 24) and the polymer material 20. In one implementation, the relative ratio may be between about 1 part carbon nanotubes to between about 10 and 80 ferrite particles. Further, the dispersal ratio may be between about 10% and 50% combined particles in proportional weight within the base polymer material.

One type of polymer 20 considered to be suitable for the coating 18 of the present concept is RBL-9050-50P Liquid Silicone Rubber. Two-part, 10 to 1 mix, clear, fabric coating grade liquid silicone rubber offers unique homogeneous mixing. This two-part pre-polymerized polymer composite is the 10 to 1 mix, clear, fabric coating grade liquid silicone rubber which has an extremely low viscosity, no post-curing requirements, and excellent electrical insulating properties. Further, this two-part pre-polymerized polymer composite is equally suitable for spray-on and dip coating applications. The 10 to 1 mix of this polymer refers to the 10 to 1 base to catalyst 87-RC ratio of the polymer.

Different forms of carbon nanotubes 22 may be utilized with the methods, systems and composites of the present concept. For example, the carbon nanotubes utilized with the proposed coating system could be single-wall carbon nanotubes, double-wall carbon nanotubes, few-wall carbon nanotubes, multi-wall carbon nanotubes, ultra-short carbon nanotubes, and combinations thereof. In some cases, the carbon nanotubes are functionalized, metal-coated and pristine carbon nanotubes. Carbon nanotubes that are to be applied to various systems of the present invention may be provided in a solution, such as a dispersant. Such solutions may also comprise surfactants to aid in the dispersion. Non-limiting examples of suitable surfactants include LDS, SDS, Zwitterionic surfactants, cationic surfactants, anionic surfactants, and the like. In more specific embodiments, the carbon nanotubes may be dispersed in N-methylpyrrolidone (NMP).

In a further aspect of the disclosure, a method for fabricating a microwave-heating crisp plate 10 includes dispersing carbon nanotubes 22 and ferrite particles 24 in a liquid-phase polymer base matrix material 20 in a predetermined relative ratio of carbon nanotubes 22 to ferrite particles 24 and in a predetermined dispersal ratio of carbon nanotubes 22 to ferrite particles 24, combined, with respect to the matrix 20 to derive a hybrid nanocoating 18. The method further includes applying the hybrid nanocoating 18 at a predetermined thickness 44 over an outer surface 16 of a body 12 defining a food-supporting surface 14 with the outer surface 16 opposite the food-supporting surface 14. Such a method can be used to derive the coating 18 described above adhered to the outer surface 16 of the crisp plate body 12, resulting in the crisp plate 10 described above and shown in FIGS. 3-5. As can be appreciated, the resulting crisp plate 10 is useable in a microwave oven 6, as shown in FIGS. 1 and 2, to provide the heating due to the absorption of microwaves 38 from the microwave oven 6 with the above-described heating profile benefits also described above.

The carbon nanotubes 22 and ferrite particles 24 are dispersed in the liquid-phase polymer base matrix material 20 using an extrusion process. The extrusion process can be implemented to further mix the two systems-based pre-polymerized compounds to derive the solid-phase polymer base matrix 20. This can be done in an additional step prior to introduction of the carbon nanotubes 22 and ferrite particles 24. Alternatively, the two systems-based pre-polymerized compounds can be mixed simultaneously with the carbon nanotubes 22 and ferrite particles 24 to result in a homogenous mixture of the subject components. In various implementations, the resulting mixture can contain the various particular carbon nanotubes 22, ferrite particles 24, and matrix materials described above. In one such implementation, the carbon nanotubes 22 may comprise carbon ferrite powder (grown in nanotube form by chemical vapor deposition, for example). The carbon nanotubes 22 may have a diameter of about 3 nm. The ferrite particles may comprise nickel manganese ferrite (Ni0.5Mn0.5Fe2O4 (NMFO)). The ferrite particles are also contemplated as nanoparticles and may, accordingly, have a diameter of between about 30 nm and 50 nm. The base polymer matrix material 20 may be RBL-9050-50P Liquid Silicone Rubber in a two-part, 10 to 1 mix, clear, fabric coating grade liquid silicone rubber formulation. The carbon nanotubes 22 and ferrite particles 24 may be mixed in a relative ratio between about 1 part carbon nanotubes to between about 10 and 18 ferrite particles. Further, combined particles may be present in a dispersal ratio of between about 10% to about 50% combined particles in proportional weight within the base polymer material 20.

The in-process coating material derived from the above mixing process may exhibit a relatively high viscosity that may not be amenable to the spraying processes that may be used to apply known crisp plate coatings. As such the in-process (liquid stage) mixture may be applied to the in-process crisp plate, consisting of the body 12 (to which the material is applied over the outer surface 16 thereof), using an injection molding process. In particular, the in-process coating material may be applied over the outer surface 16 of body 12 by insert molding the material over the outer surface 16 with the body 12 placed in an appropriately-configured mold that accommodates the body 12 within a cavity 7 that is further shaped to receive the injected in-process material, in liquid form, and impart the desired shape for coating 18 to the material. In this respect, the mold cavity can include features needed to impart the above-described perforations 40 and feet 42 in the derived coating 18 of a thickness 44 according to any particular implementation of the coating 18 within the parameters discussed above. In alternative implementations of the method, the hybrid nanocoating 18 is applied over the outer surface 16 of the body 12 using a hot-melt process, wherein the in-process material is heated to reduce the viscosity thereof for even application over the outer surface 16 of the body 12. In further alternatives, the hybrid nanocoating 18 may be applied over the outer surface 16 of the body 12 either as a hot-stamping or screen-printing process, as applied to the in-process coating material.

Once applied to the outer surface 16 of the body 12, the liquid-phase polymer base matrix material undergoes a phase-change to the solid-phase polymer base matrix 20. In the above-described implementation of the method, in which an injection molding process is used, the liquid-to-solid phase change occurs, at least partially, in the mold. In implementations using the two systems-based pre-polymerized compounds, described above, the phase-change may occur by cross-linking of the pre-polymerized compounds. As the cross-linking may occur over a predetermined period of time, the crisp plate 10 may be removed from the mold before the cross-linking is fully completed, but at a stage where the coating 18 has solidified enough to retain the shape imparted by the injection molding under proper handling. Once the phase change has been completed, the carbon nanotubes 22 and ferrite particles 24 will be fixed within the polymer base material 20 in the dispersed manner achieved during the mixing process.

Example 1

For Example 1, the hybrid nanocoating 18 is prepared using about 1.5% carbon ferrite powder nanotubes and about 20% nickel manganese ferrite microparticles, along with about 80% of a two-part silicone. The process of creating the hybrid liner starts with the dispersion of the carbon nanotubes and ferrite particles into the two-part silicone liquid polymer using a small kneader. Once thoroughly incorporated, the in-process coating material is applied to the outside surface of a crisp-plate by hand and a rolling pin. To improve the release of entrapped air and gaseous residues during crosslinking, small holes are engraved into the coating with a spike roller. The coating is allowed to cure until generally solidified. The crisp plate according to the present example was prepared and placed in a microwave oven with three small ceramic tiles between the coating and the turntable glass of the microwave in place of the above-described feet. The microwave oven was then closed and run for ten minutes at 750 W. The microwave oven operation was briefly stopped at intervals of 3, 5 and 7 minutes and the temperature of the food supporting surface was measured both in the center and toward the outer perimeter thereof with an infrared gun. The temperature of the food supporting surface was also measured at completion of the ten minute process. By the five-minute interval, the temperature exhibited was approximately 250° F. and was maintained through the end of the ten minute interval.

In summary, the methods and systems of the present invention can be tailored to various sizes and shapes, along with the use of different carbon nanotubes or polymers based on the multifunctional composite requirements. The formed composite coating along with the injection molding option, can also be implemented in several ways to produce a cylindrical shape and other such geometries. In short, a hybrid composite coating system is developed by utilizing different sizes carbon nanotubes, a selected liquid polymer, and ferrite nanoparticles in a single reaction to achieve highly uniform surfaces with fast heating rate and provide an access to tune nanotubes through irradiated microwave radiations, such that an upper temperature limit is provided by exploiting a controlled loading concentration of carbon nanotubes embedded into its blending agents.

The invention disclosed herein is further summarized in the following paragraphs and is further characterized by combinations of any and all of the various aspects described therein.

According to another aspect of the present disclosure, a microwave-heating crisp plate includes a body defining a food-supporting surface and an outer surface opposite the food-supporting surface, and a coating applied over at least a portion of the outer surface. The coating includes a base polymer material defining a matrix, carbon nanotubes, and ferrite particles. The carbon nanotubes and the ferrite particles are dispersed throughout the matrix in a predetermined relative ratio and in a predetermined dispersal ratio with respect to the matrix.

The carbon nanotubes may comprise carbon ferrite powder.

The carbon ferrite powder may have a low Curie temperature of about 210° C.

The ferrite particles may comprise nickel manganese ferrite.

The nickel manganese ferrite may have a high Curie temperature of about 350° C.

The relative ratio may be about 1 part carbon nanotubes to between about 10 and 80 parts ferrite particles.

The base polymer matrix may comprise a two-part silicone.

The dispersal ratio may be between about 10% and 50% carbon nanotubes and the ferrite particles, combined, to base polymer material, by weight.

The coating may define a plurality of perforations at least partially therethrough in a direction toward the outside surface of the body.

According to yet another aspect, a method for fabricating a microwave-heating crisp plate includes dispersing carbon nanotubes and ferrite particles in a liquid-phase polymer base matrix material in a predetermined relative ratio of carbon nanotubes to ferrite particles and in a predetermined dispersal ratio of carbon nanotubes to ferrite particles, combined, with respect to the matrix to derive a hybrid nanocoating. The method further includes applying the hybrid nanocoating at a predetermined thickness over an outer surface of a body defining a food-supporting surface and the outer surface opposite the food-supporting surface.

The hybrid nanocoating can be applied over the outer surface of the body by injection molding.

The hybrid nanocoating can be applied over the outer surface of the body by a hot-melt process.

The hybrid nanocoating can be applied over the outer surface of the body by one of a hot-stamping or screen-printing process.

The step of applying the hybrid nanocoating over the outer surface of the body may further form a plurality of perforations at least partially therethrough in a direction toward the outside surface of the body.

The step of applying the hybrid nanocoating over the outer surface of the body may further form a plurality of feet extending disposed from the outside surface at a distance beyond the predetermined thickness of the coating.

The liquid-phase polymer base matrix material may undergo a phase-change to a solid-phase polymer base matrix after the step of applying the hybrid nanocoating over the outer surface of the body, the carbon nanotubes and ferrite particles remaining dispersed in the solid-phase polymer base matrix.

The liquid-phase polymer base matrix material may comprise two systems-based pre-polymerized compounds that cross-link during the phase-change such that the solid-phase polymer base matrix comprises two-part silicone.

The carbon nanotubes and ferrite particles may be dispersed in the liquid-phase polymer base matrix material using an extrusion process. The extrusion process may further mix two systems-based pre-polymerized compounds to derive the solid-phase polymer base matrix with the carbon nanotubes and ferrite particles dispersed therein.

According to yet another aspect, a microwave-heating crisp plate includes a body defining a food-supporting surface and an outer surface opposite the food-supporting surface. A coating is applied over at least a portion of the outer surface and includes a base polymer material defining a matrix, carbon nanotubes having a low Curie temperature of about 210° C., and ferrite particles having a high Curie temperature of about 350° C. The carbon nanotubes and the ferrite particles are dispersed throughout the matrix.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A microwave-heating crisp plate, comprising:
a body defining a food-supporting surface and an outer surface opposite the food-supporting surface; and
a coating applied over at least a portion of the outer surface, including:
a base polymer material defining a matrix;
carbon nanotubes; and
ferrite particles;
wherein the carbon nanotubes and the ferrite particles are dispersed throughout the matrix in a predetermined relative ratio, between 1 part carbon nanotubes to between about 10 and 80 ferrite particles, and in a predetermined dispersal ratio with respect to the matrix.

2. The microwave-heating crisp plate of claim 1, wherein the carbon nanotubes comprise carbon ferrite powder.

3. The microwave-heating crisp plate of claim 2, wherein the carbon ferrite powder has a low Curie temperature of about 210° C.

4. The microwave-heating crisp plate of claim 1, wherein the ferrite particles comprise nickel manganese ferrite.

5. The microwave-heating crisp plate of claim 4, wherein the nickel manganese ferrite has a high Curie temperature of about 350° C.

6. The microwave-heating crisp plate of claim 1, wherein the base polymer material comprises a two-part silicone.

7. The microwave-heating crisp plate of claim 1, wherein the coating defines a plurality of perforations at least partially therethrough in a direction toward the outer surface of the body.

8. The microwave-heating crisp plate of claim 1, wherein the dispersal ratio is between about 10% and 50% of the carbon nanotubes and the ferrite particles, combined, within the base polymer material, the carbon nanotubes, and the ferrite particles, combined, by weight.

9. The microwave-heating crisp plate of claim 1, wherein the body is composed of aluminum or ceramic.

10. A method for fabricating a microwave-heating crisp plate, comprising:
dispersing carbon nanotubes and ferrite particles in a liquid-phase polymer base matrix material in a predetermined relative ratio of carbon nanotubes to ferrite particles and in a predetermined dispersal ratio of the carbon nanotubes to the ferrite particles, combined, with respect to the matrix to derive a hybrid nanocoating;
applying, by one of an injection molding, hot stamping, or hot screen-printing process, the hybrid nanocoating at a predetermined thickness over an outer surface of a body defining a food-supporting surface and an outer surface opposite the food-supporting surface.

11. The method for fabricating a microwave-heating crisp plate of claim 10, wherein the hybrid nanocoating is applied over the outer surface of the body by injection molding.

12. The method for fabricating a microwave-heating crisp plate of claim 10, wherein the step of applying the hybrid nanocoating over the outer surface of the body further forms a plurality of perforations at least partially therethrough in a direction toward the outer surface of the body.

13. The method for fabricating a microwave-heating crisp plate of claim 10, wherein the step of applying the hybrid nanocoating over the outer surface of the body further forms a plurality of feet extending disposed from the outside surface at a thickness greater than the predetermined thickness of the coating.

14. The method for fabricating a microwave-heating crisp plate of claim 10, wherein the liquid-phase polymer base matrix material undergoes a phase-change to a solid-phase polymer base matrix after the step of applying the hybrid nanocoating over the outer surface of the body, the carbon nanotubes and the ferrite particles remaining dispersed in the solid-phase polymer base matrix.

15. The method for fabricating a microwave-heating crisp plate of claim 14, wherein the liquid-phase polymer base matrix material comprises two systems-based pre-polymerized compounds that cross-link during the phase-change such that the solid-phase polymer base matrix comprises two-part silicone.

16. The method for fabricating a microwave-heating crisp plate of claim 10, wherein the carbon nanotubes and the ferrite particles are dispersed in the liquid-phase polymer base matrix material using an extrusion process.

17. The method for fabricating a microwave-heating crisp plate of claim 16, wherein the extrusion process further mixes two systems-based pre-polymerized compounds to derive a solid-phase polymer base matrix with the carbon nanotubes and the ferrite particles dispersed therein.

18. The method of claim 10, wherein the body is composed of aluminum.

19. The method of claim 10, wherein the body is composed of ceramic.

20. A microwave-heating crisp plate, comprising:
a body defining a food-supporting surface and an outer surface opposite the food-supporting surface; and
a coating applied over at least a portion of the outer surface, including:
a base polymer material defining a matrix;
carbon nanotubes having a low Curie temperature of about 210° C.; and
ferrite particles having a high Curie temperature of about 350° C.;
wherein the carbon nanotubes and the ferrite particles are dispersed throughout the matrix.

* * * * *